United States Patent
Bolshtyansky et al.

(10) Patent No.: US 9,712,252 B2
(45) Date of Patent: Jul. 18, 2017

(54) ADAPTIVE EQUALIZER WITH COEFFICIENTS DETERMINED USING GROUPS OF SYMBOLS TO COMPENSATE FOR NONLINEAR DISTORTIONS IN OPTICAL FIBER COMMUNICATIONS

(71) Applicant: Tyco Electronics Subsea Communications LLC, Eatontown, NJ (US)

(72) Inventors: Maxim Bolshtyansky, East Windsor, NJ (US); Oleg V. Sinkin, Long Branch, NJ (US); Hongbin Zhang, Marlboro, NJ (US)

(73) Assignee: TYCO ELECTRONICS SUBSEA COMMUNICATIONS LLC, Eatontown, NJ (US)

( * ) Notice: Subject to any disclaimer, the term of this patent is extended or adjusted under 35 U.S.C. 154(b) by 0 days.

(21) Appl. No.: 14/949,826

(22) Filed: Nov. 23, 2015

(65) Prior Publication Data

US 2017/0149510 A1 May 25, 2017

(51) Int. Cl.
H04B 10/06 (2006.01)
H04B 10/61 (2013.01)
H04L 25/03 (2006.01)

(52) U.S. Cl.
CPC ..... *H04B 10/616* (2013.01); *H04L 25/03019* (2013.01)

(58) Field of Classification Search
CPC ...... H04B 10/616; H04B 10/00; H04B 10/60; H04B 10/612; H04B 10/677; H04B 10/697; H04B 10/61; H04B 10/611; H04B 10/64; H04B 10/6971; H04B 10/0779; H04B 10/6165; H04B 10/613; H04B 10/614; H04L 25/03019; H04L 2027/0042; H04L 27/3818

USPC ...................... 398/202, 208, 203, 204, 149
See application file for complete search history.

(56) References Cited

U.S. PATENT DOCUMENTS

| | | | | |
|---|---|---|---|---|
| 891,399 | A * | 6/1908 | Brews | F22D 1/42 122/428 |
| 5,448,531 | A * | 9/1995 | Dragoset, Jr. | G01V 1/36 367/21 |
| 5,499,268 | A * | 3/1996 | Takahashi | H04L 25/03019 329/307 |
| 6,134,211 | A * | 10/2000 | Miyanabe | G11B 20/22 369/124.02 |

(Continued)

FOREIGN PATENT DOCUMENTS

EP 2648346 10/2013

OTHER PUBLICATIONS

Douillard et al; "Iterative Correction of Intersymbol Interference: Turbo-Equalization;" European Transactions on Telecommunications, John Wiley & Sons, 1995, 6 (5), pp. 507-512.

(Continued)

*Primary Examiner* — Hibert Woldekidan (57) ABSTRACT

An adaptive equalizer with coefficients determined by averaging an estimated filter coefficient over a number, N, of past and future symbols. Estimated filter coefficients may be optimized by optimization of the number N, an averaging window function and a scaling factor using a metric. The metric also allows estimation of the amount of noise that may be compensated by an adaptive equalizer consistent with the present disclosure.

18 Claims, 7 Drawing Sheets

(56) References Cited

U.S. PATENT DOCUMENTS

| | | | |
|---|---|---|---|
| 8,086,114 B2* | 12/2011 | Liu | H04B 10/60 |
| | | | 398/205 |
| 8,103,177 B2* | 1/2012 | Zhang | H04B 10/61 |
| | | | 375/279 |
| 8,300,802 B2* | 10/2012 | Deng | H04B 3/23 |
| | | | 370/290 |
| 8,494,368 B2 | 7/2013 | Xie et al. | |
| 8,532,503 B2* | 9/2013 | Nakashima | H04B 10/60 |
| | | | 398/202 |
| 8,588,624 B2* | 11/2013 | Zhang | H04B 10/0779 |
| | | | 398/208 |
| 8,805,209 B2 | 8/2014 | Li et al. | |
| 8,861,980 B2* | 10/2014 | Ohtomo | H04B 10/611 |
| | | | 398/205 |
| 8,873,971 B2 | 10/2014 | Ip et al. | |
| 8,907,840 B2* | 12/2014 | Kanamoto | G01S 3/74 |
| | | | 342/107 |
| 8,976,852 B2* | 3/2015 | Huang | H03M 13/2957 |
| | | | 375/224 |
| 9,300,401 B2* | 3/2016 | Dou | H04B 10/616 |
| 2011/0311001 A1* | 12/2011 | Lindenbauer | H04L 25/03006 |
| | | | 375/340 |
| 2012/0189319 A1* | 7/2012 | Mo | H04B 10/2569 |
| | | | 398/152 |
| 2013/0216239 A1* | 8/2013 | Zhang | H04B 10/613 |
| | | | 398/202 |
| 2014/0064345 A1 | 3/2014 | Sugitani et al. | |
| 2015/0071652 A1 | 3/2015 | Zhuge et al. | |

OTHER PUBLICATIONS

Djordjevic et al; "Nonlinear BCJR Equalizer for Suppression of Intrachannel Nonlinearities in 40 Gb/s Optical Communications Systems"; Optics Express; May 29, 2006; vol. 14, No. 11; pp. 4625-4635.

Dar et al; "Inter-Channel Nonlinear Interference Noise in WDM Systems: Modeling and Mitigation;" Journal of Lightwave Technology; vol. 33, No. 5; Mar. 1, 2015; pp. 1044-1053.

Sinkin et al; "Nonlinearity Compensation Metric;" TE Subcom, Eatontown, NJ 07724, USA.

International Search Report dated Feb. 10, 2017, received in PCT Application No. PCT/US2016/062148.

* cited by examiner

ADAPTIVE EQUALIZER WITH COEFFICIENTS DETERMINED USING GROUPS OF SYMBOLS TO COMPENSATE FOR NONLINEAR DISTORTIONS IN OPTICAL FIBER COMMUNICATIONS

TECHNICAL FIELD

The present application relates to the optical transmission of information and, more particularly, to a system and method including an adaptive equalizer with coefficients determined using groups of symbols to compensate for nonlinear distortions in optical fiber communications.

BACKGROUND

In wavelength division multiplexed (WDM) optical communication systems, a number of different optical carrier wavelengths are separately modulated with data to produce modulated optical signals. The modulated signals are combined into an aggregate signal and transmitted over an optical transmission path to a receiver. The receiver detects and demodulates the data.

During transmission of the modulated signals over the transmission path, there are linear and non-linear impairments in the path. The linear impairments include chromatic dispersion (CD), polarization mode dispersion (PMD) and polarization dependent loss (PDL) and other similar effects. In general, chromatic dispersion is a differential delay in propagation of different wavelengths through the transmission path, and polarization mode dispersion is a differential delay in propagation of different polarizations through the transmission path. Polarization dependent loss is a differential attenuation for different polarizations through an optical path. The nonlinear impairments are related to nonlinear response of the transmission system and could be classified as self-phase modulation, cross-phase-modulation, four wave mixing (FWM) and other effects.

In phase modulated optical communication systems, e.g. systems using a phase-shift keying (PSK) or quadrature amplitude modulation (QAM) format, the receiver may be a coherent receiver using coherent detection, e.g. homodyne or heterodyne detection, to detect modulated optical signals. The term "coherent" when used herein in relation to a receiver refers to a receiver including a local oscillator (LO) for demodulating the received signal. Digital signal processing (DSP) may be implemented in such systems for processing the received signals to provide demodulated data. Digital signal processing of the received signal provides speed and flexibility, and may be used to perform a variety of functions including correction of nonlinearities associated with the optical transmission path such as chromatic dispersion, polarization mode dispersion, etc.

The DSP in the receiver may use an adaptive equalizer to recover transmitted information symbols from the received data. In one known example, an adaptive filter may be configured as a decision-directed adaptive linear filter. The filter may use a Least Mean Squares (LMS) estimation in which in which the coefficients $H_k^n$ for symbol n and tap k are adjusted based on the post-equalizer decision $I_n$ and samples $y_k^n$ as $$H_k^{n+1} = H_k^n + \mu \epsilon_n y_k^{n*}, \qquad (0)$$

where $\epsilon_n = I_n - y_k^n$ is the error signal and $\mu$ is a positive number small enough to ensure the convergence of the algorithm. The LMS estimation adjusts the filter coefficients to minimize the error signal $\epsilon_n$. Other known adaptive filters may be configured as Recursive Least Squares (RLS) and Constant Modulus Algorithm (CMA), Multimodulus Algorithm (MMA) filters.

One known adaptive equalizer configuration using an RLS estimation of the signal after applying the back-propagation method is described in *Inter-Channel Nonlinear Interference Noise in WDM Systems: Modeling and Mitigation Analysis of Polarization* by R. Dar et al., published in the Journal of Lightwave Technology, vol. 33, No. 5, pp, 1044-1053, Mar. 1, 2015. Use of a back-propagation method may be effective but may be highly complex. Lower complexity versions may have limited capabilities in transmission paths that do not include chromatic dispersion compensation.

BRIEF DESCRIPTION OF THE DRAWINGS

These and other features and advantages will be better understood by reading the following detailed description, taken together with the drawings wherein.

DETAILED DESCRIPTION

A system and method consistent with the present disclosure includes a linear adaptive equalizer wherein filter coefficients are determined using groups of past and future symbols to demodulate current symbols and compensate for nonlinear distortions. Using groups of symbols to adjust filter coefficients makes possible the use of several adjustable system parameters which may be optimized for each filter tap. Larger numbers of adjustable parameters allows for improved precision in compensating for nonlinearities and allows for a relatively low-complexity configuration.

Figure 1:
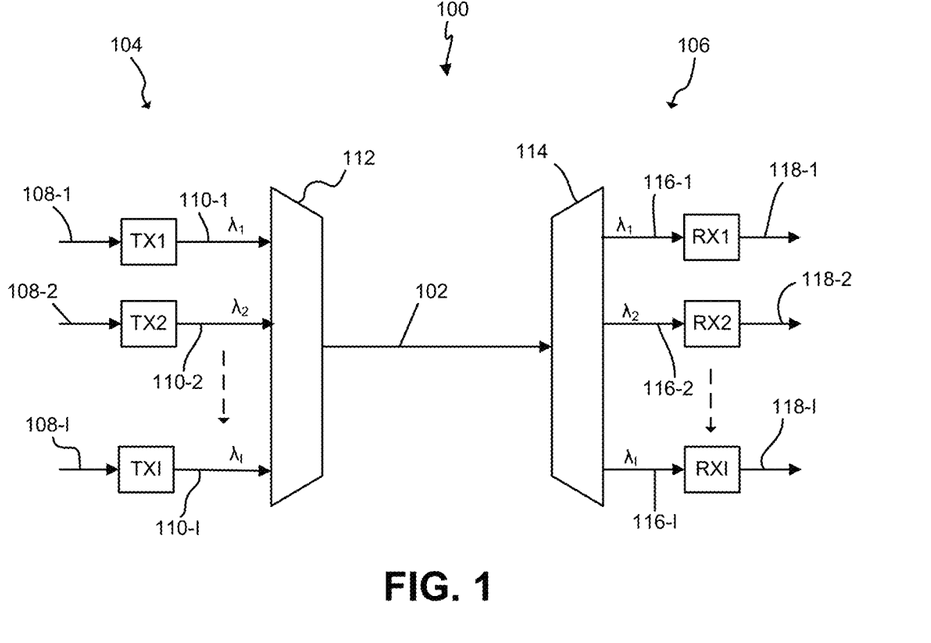
FIG. 1 is a block diagram of one exemplary embodiment of a system consistent with the present disclosure.

Turning now to FIG. 1 there is provided a simplified block diagram of one exemplary embodiment of a WDM transmission system 100 in which an adaptive filter may be used consistent with the present disclosure. The transmission system serves to transmit a plurality of optical channels over an optical information path 102 from a transmitting terminal 104 to one or more remotely located receiving terminals 106. The exemplary system 100 may be a long-haul submarine system configured for transmitting the channels from a transmitter to a receiver at a distance of 5,000 km, or more. Although exemplary embodiments are described in the context of an optical system, and are useful in connection with a long-haul WDM optical system, the broad concepts discussed herein may be implemented in other communication systems transmitting and receiving other types of signals.

The system 100 has been depicted as a highly simplified point-to-point system for ease of explanation. For example, the transmitting terminal 104 and receiving terminal 106 may, of course, both be configured as transceivers, whereby each may be configured to perform both transmitting and receiving functions. For ease of explanation, however, the terminals are depicted and described herein with respect to only a transmitting or receiving function. It is to be understood that a system and method consistent with the disclosure may be incorporated into a wide variety of network components and configurations. The illustrated exemplary embodiments herein are provided only by way of explanation, not of limitation.

In the illustrated exemplary embodiment, each of a plurality of transmitters TX1, TX2 . . . TXI receives a data signal on an associated input port 108-1, 108-2 . . . 108-I, and transmits the data signal on associated wavelength $\lambda_1$, $\lambda_2$ . . . $\lambda_I$. One or more of the transmitters TX1, TX2 . . . TXI may be configured to modulate data on the associated wavelength using a modulation format, such as a PSK or QAM modulation format. The transmitters, of course, are shown in highly simplified form for ease of explanation. Those skilled in the art will recognize that each transmitter may include electrical and optical components configured for transmitting the data signal at its associated wavelength with a desired amplitude and modulation.

The transmitted wavelengths or channels are respectively carried on a plurality of paths 110-1, 110-2 . . . 110-I. The data channels are combined into an aggregate signal on optical path 102 by a multiplexer or combiner 112. The optical information channel 102 may include optical fiber waveguides, optical amplifiers, optical filters, and other active and passive components. The optical information channel 102 may, or may not, include chromatic dispersion compensation modules.

The aggregate signal may be received at one or more remote receiving terminals 106. A demultiplexer 114 separates the transmitted channels at wavelengths $\lambda_1$, $\lambda_2$ . . . $\lambda_I$ onto associated paths 116-1, 116-2 . . . 116-I coupled to associated receivers RX1, RX2 . . . RXI. One or more of the receivers RX1, RX2 . . . RXI may be configured to demodulate the transmitted signal using an adaptive equalizer consistent with the present disclosure and provide an associated output data signal on an associated output path 118-1, 118-2, 118-3, 118-I.

Figure 2:
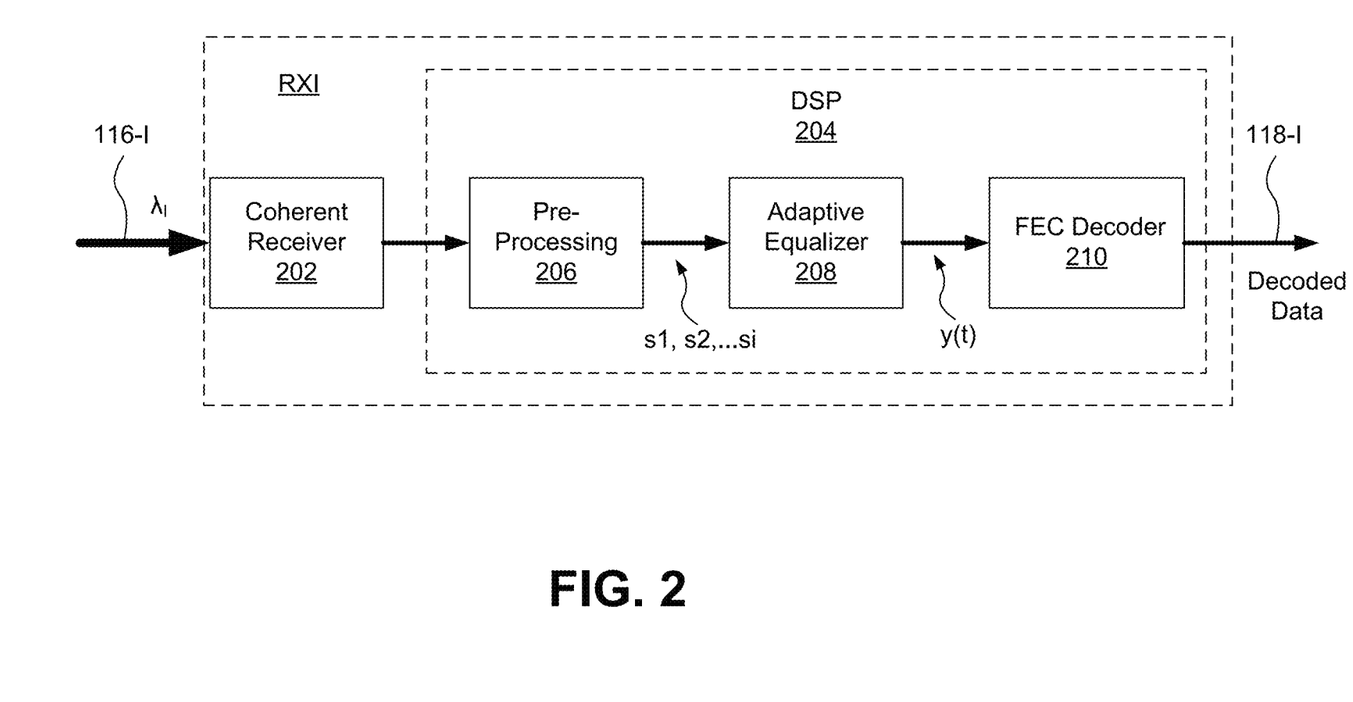
FIG. 2 is a block diagram of one exemplary embodiment of a receiver consistent with the present disclosure.

FIG. 2 is a simplified block diagram of one exemplary receiver RXI consistent with the present disclosure. In the illustrated exemplary embodiment, the receiver RXI, includes a coherent receiver configuration 202 for receiving an input signal from the transmitting terminal 104 on path 116-I and a digital signal processing (DSP) circuit 204 for processing the output of the coherent receiver 202 to provide an output data signal on path 118-I. Data is modulated on the carrier wavelength $\lambda_I$ of the optical input signal according to a modulation format. The coherent receiver 202 receives the optical input signal and produces digitized samples representing the symbols in the optical signal and thus the data modulated on the optical signal. The DSP circuit 204 processes samples of the output of the coherent receiver 202 to determine the data values (e.g., the bit values) represented by the samples and provides decoded data on path 118-I representative of the data or bit values.

The coherent receiver 202 may take a known configuration dependent upon the modulation format used in modulating data on the optical inputs signal. For example, the receiver may be configured for detecting a polarization multiplexed QAM input optical signal, e.g. on carrier wavelength X. In such a configuration, different polarizations of the input optical signal may be split onto separate paths and each polarization may be provided to an associated known 90° optical hybrid. The optical hybrids deliver the four mixed signals to two pairs of balanced detectors and the outputs of the balanced detectors are converted to digital signals by analog-to-digital (A/D) converters.

The digital output(s) of the coherent receiver 202 are provided as inputs to the DSP circuit 204. In general, DSP involves processing of signals using one or more application specific integrated circuits (ASICS) and/or special purpose processors configured for performing specific instruction sequences, e.g. directly and/or under the control of software instructions. In the illustrated exemplary embodiment, the DSP circuit 204 is shown as including a pre-processing function 206, an adaptive equalizer function 208 and a forward error detection (FEC) decoder function 210. The pre-processing function 206 receives digital output(s) of the coherent receiver 202 and processes them to provide a serial stream of pre-processed digitized symbol outputs s1, s2 . . . si each of which is representative of an associated one of the symbols (e.g. the phase of a phase modulated signal) and thus the data modulated on the optical signal.

The pre-processing function 206, adaptive equalizer function 208 and FEC decoder function 210 may be implemented in a variety of configurations using any combination of hardware, software and/or firmware Although the functions are illustrated separately, it is to be understood that any one or more of the functions may be performed in a single integrated circuit or processor, or in a combination of integrated circuits and/or processors. Also, the integrated circuits and/or processors implementing the DSP functions may be shared among the illustrated functions in whole or in part.

In one embodiment, the pre-processing function 206 of the DSP circuit 204 may include known optical signal detection functions implemented in DSP-based coherent detection receivers. The pre-processing function 206 may include, for example, a waveform recovery and alignment function, a deterministic distortion compensation function, a clock recovery function, a synchronized data re-sampling function, a local oscillator (LO) frequency offset tracking function and/or a carrier phase estimation function.

The adaptive equalizer function 208 implements an adaptive equalizer consistent with the present disclosure, as will be described in greater detail herein. In general, the adaptive equalizer function 208 receives the symbol outputs s1, s2 . . . Sn of the pre-processing function 206 and uses the symbol outputs and their corresponding bit decisions to decode the received signal to generate an output signal y(t) representative of the value of each bit in encoded in the optical signal received on path 116-I. The output signal y(t) may be provided directly to the FEC decoder function, which provides decoded data on path 118-I.

The FEC decoder function 210 may be applied to the output of the adaptive equalizer function to improve bit error rate. FEC generally involves insertion of a suitable error correction code into a transmitted data stream to facilitate detection and correction of data errors about which there is no previously known information. Error correction codes are generated in a FEC encoder for the data stream and are sent to a receiver including a FEC decoder. The FEC decoder function recovers the error correction codes and uses them to correct any errors in the received data stream. The FEC decoder function may take a known configuration for decoding data encoded with any known FEC code.

Figure 3:
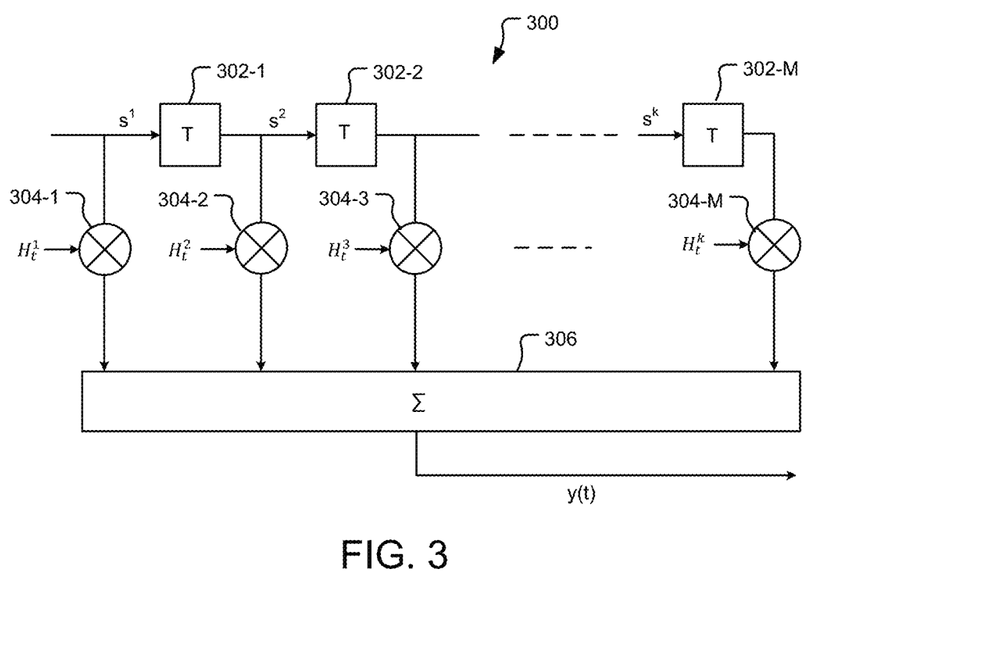
FIG. 3 is a block diagram illustrating one exemplary embodiment of an adaptive linear filter useful in a receiver consistent with the present disclosure.

FIG. 3 is a block diagram illustrating one embodiment 300 of a linear filter useful in an adaptive equalizer function 208 consistent with the present disclosure. In the illustrated example, the linear filter 300 is configured as a tapped delay adaptive filter, where k is the number of taps. The adaptive filter 300 includes delays 302 (T) including delays 302-1, 302-2 . . . 302-M, multipliers 304 including multipliers 304-1, 304-2, 304-3 . . . 304-M, and a summer 306. The input signals to the adaptive filter are the symbol outputs s1, s2 . . . si of the pre-processing function 206. Each of the multipliers 304-1, 304-2, 304-3 . . . 304-M receives a respective filter coefficient $H_t^k$, k=1 to k from a memory (not shown) and multiplies the filter coefficient by the value received from either the input signal or the associated one of the delays, as shown. The resulting tap weight products are summed by the summer 306 and the result is supplied as the output y(t) of the adaptive filter 300. The output y(t) of the adaptive filter 300 is provided continuously with the values of $H_t^k$ being updated as will be described below.

In a system and method consistent with the present disclosure, the filter coefficients $H_t^k$ are updated using groups of past and future symbols and by optimizing several parameters. Calculating filter coefficients $H_t^k$ using groups of past and future symbols may be performed by storing a range of symbols and performing coefficient calculations on a symbol within the range using symbols before and after the symbol that is subject to the calculation. As used herein the term "future" used with respect to a symbol refers to a symbol that follows a calculated symbol in time but was included in a stored range of symbols for purpose of calculating the calculated symbol. Likewise the term "past" when used with respect to a symbol refers to a symbol that precedes a calculated symbol in time but was included in a stored range of symbol for the purpose of calculating the calculated symbol.

Consistent with the present disclosure, the transmitter may transmit a signal $x_t$ that carries data using a chosen modulation format. At the receiver, equalization of the signal may be performed by the adaptive equalizer function 208 so that the output signal $y_t$ is recovered from slow carrier phase and frequency offsets, polarization distortions, and static linear channel distortions. Ideally, $y_t = x_t$ in the absence of noise. However, in presence of noise and uncompensated distortions $\Delta_t = y_t - x_t$ represents the error signal. The following general assumption may be made, wherein l is a summation range (e.g. the number of taps k in a linear filter):

$$\Delta_t = \Sigma_l H_t^l y_{t+l} + q, \quad (1)$$

where $H_t^l$ is a filter coefficient for current symbol t and a summation range l, and q is noise term such as amplified spontaneous emission (ASE). In the following we assume that $H_t^l$ changes with time and the summation range l will be optimized.

To find the appropriate set of coefficients $H_t^l$ to calculate $\Delta_t$ from the received data, the term q is assumed to represent noise such as ASE, which is zero mean and statistically independent of the signal $y_t$. It is also assumed that $y_t - x_t$ is zero mean. Term $H_t^l$ represents the effect of nonlinear distortion but it is assumed that it may contain residual (both static and time-variant) linear distortions that were not compensated. By nature of nonlinearity, the coefficients $H_t^l$ are assumed to be not completely uncorrelated so that $$\langle H_t^l H_{t+1}^{l*} \rangle \neq 0, \quad (2)$$

where $\langle \ldots \rangle$ indicates averaging over some number of symbols past and future symbols, N, e.g.:

$$\langle G_t \rangle \equiv \frac{1}{N+1} \sum_{n=-N/2}^{N/2} G_{t+n} \quad (2.1)$$

To estimate $H_t^l$ equation (1) may be rewritten as $$H_t^k = \frac{\Delta_t - \sum_{l \neq k} H_t^l y_{t+l} - q}{y_{t+l}} \quad (3)$$

where k is the number of taps in a linear filter. $E_t^l$ may be considered as an estimate of $H_t^l$ such that $$\delta_t = \Sigma_l E_t^l y_{t+l} \quad (4)$$

where $\delta_t$ is the estimate of $\Delta_t$.

To optimize, the goal may be to find $E_t^l$ such that the difference $\delta_t - \Delta_t$ is minimized. To find the optimum $E_t^l$ an averaging of equation (3) may be performed. This averaging of equation (3) will lead to statistical cancellation of all terms in equation (3) except for $$\frac{\Delta_t}{y_{t+l}}.$$

As such, a different functional form of averaging may be used by defining $_p^N E_t^l$ as:

$$_p^N E_t^k = \alpha_k \frac{\langle \Delta_t \cdot |y_{t+k}|^p \exp(-i \cdot \arg(y_{t+k})) W_t^k \rangle}{\langle |y_{t+k}|^{p+1} \rangle}, \quad (5)$$

where $\langle \ldots \rangle$ indicates averaging over some number of symbols N as indicated by equation (2.1), and $W_t^k$ is an averaging window function that may be different for different k, and $\alpha_k$ is a scaling factor. In a simple case, where $W_t^k$ is a rectangular function, $\alpha_k = 1$, and p=−1

$$_{-1}^N E_t^k = \left\langle \frac{\Delta_t}{y_{t+k}} \right\rangle \quad (6)$$

and with p=1

$$_1^N E_t^k = \frac{\langle \Delta_t \cdot y_{t+k}^* \rangle}{\langle |y_{t+k}|^2 \rangle}. \quad (7)$$

To maximize the correlation of the coefficients in equation (5), a parameter, p, may be defined by considering a quantity:

$$c_t^k(p) = \Delta_t \cdot |y_{t+k}|^p \exp(-i \cdot \arg(y_{t+k}))  \quad (8)$$

related to $_p^N E_t^l$ and its normalized correlation $\gamma_c$ $$\gamma_c = \frac{\langle c_t^k c_{t+1}^{k*} W_t^k \rangle}{\langle |c_t^k|^2 W_t^k \rangle}. \quad (9)$$

Figure 4:
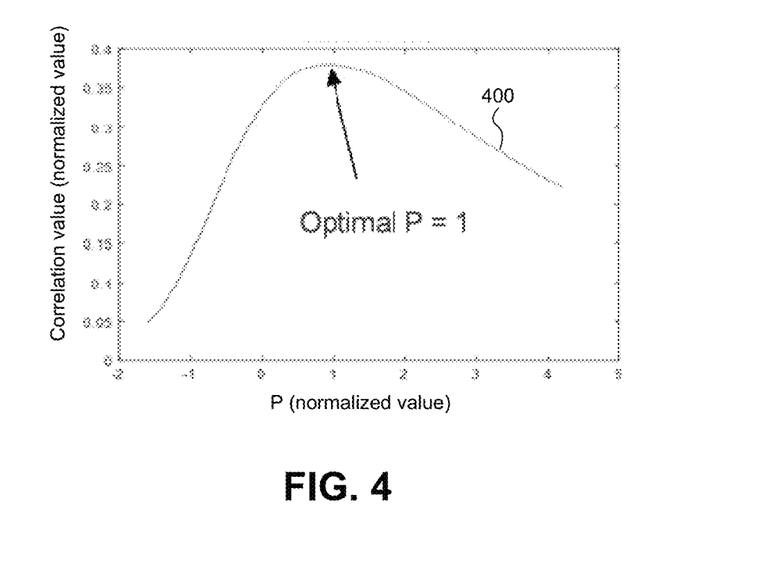
FIG. 4 includes a plot of correlation of estimated filter coefficients vs. power illustrating the dependence of $\gamma_c$ on parameter p in a system and method consistent with the present disclosure.

For an experimental data sample acquired after a slow equalization and corresponding to a 32 Gbaud, 16-QAM-based signal transmitted over ~6,000 km of dispersion uncompensated fiber system, FIG. 4 includes a plot 400 of correlation of the coefficients (normalized value) in equation (5) vs. power p (normalized value) illustrating the dependence of $\gamma_c$ on parameter p. The maximum correlation for the sample is achieved with p=1, which suggests use of the form of averaging as in equation (7). Alternatively, the parameter, p, could be determined based on minimization of $\delta_t - \Delta_t$. However, for the following analysis we will use the estimate based on p=1:

$$_p^N E_t^k = {_1^N} E_t^k = \alpha_k \frac{\langle \Delta_t \cdot y_{t+k}^* W_t^k \rangle}{\langle |y_{t+k}|^2 W_t^k \rangle}. \quad (10)$$

Figure 5:
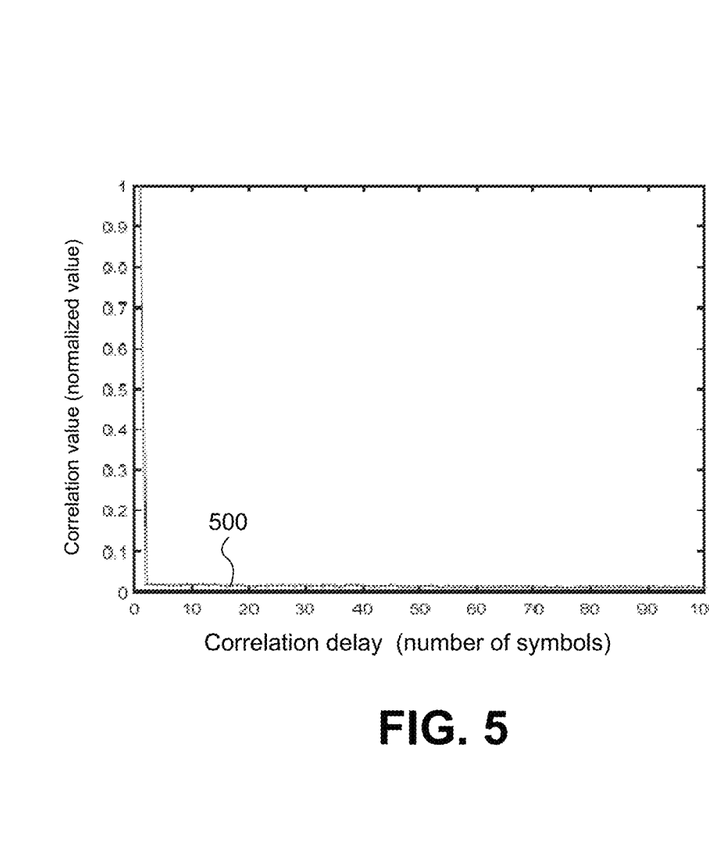
FIG. 5 includes a plot of correlation of estimated filter coefficients vs. correlation delay illustrating performance of a system and method consistent with the present disclosure.
Figure 6:
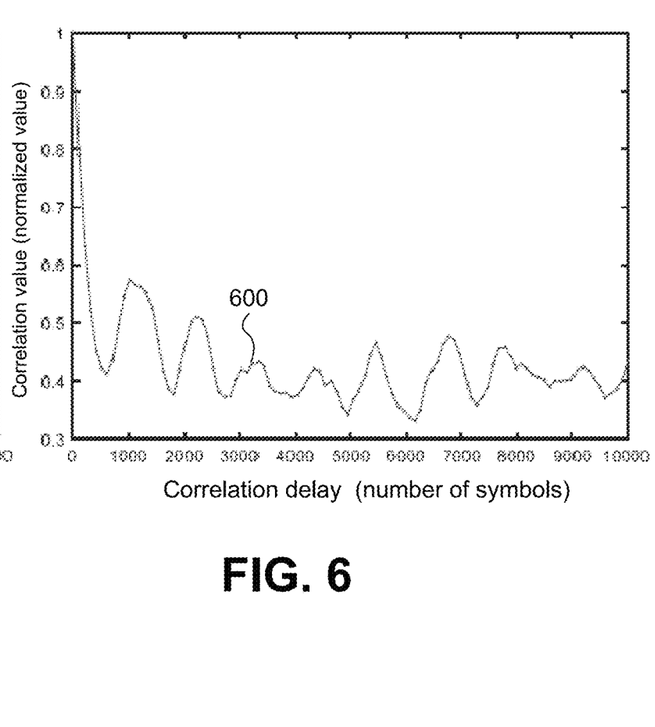
FIG. 6 includes another plot of correlation of estimated filter coefficients vs. correlation delay illustrating performance of a system and method consistent with the present disclosure.

FIGS. 5 and 6 include plots 500 and 600, respectively, of correlation of the coefficients (normalized value) vs. correlation delay (number of symbols) illustrating an example of correlations of coefficients $_1^N E_t^k$ for a simulated system under test with:

$$\gamma_\tau^N = \langle {_1^N} E_t^k \cdot {_1^N} E_{t+\tau}^{k*} \rangle \quad (11)$$

FIG. 5 shows correlation vs. correlation delay for $\gamma_\tau^N$ with N=1 and FIG. 6 shows correlation vs. correlation delay for $\gamma_\tau^N$ with N=100. As shown in FIG. 5, there is no correlation of the coefficients of equation $_1^N E_t^k$ with N=1. The absence of correlation of $_1^N E_t^k$ for a given N indicates that nonlinear distortions are uncorrelated and statistical processing of data will not result in any nonlinear compensation benefit with this choice of N. In contrast, as shown in FIG. 6, with N=100 there is correlation of the coefficients of equation $_1^N E_t^k$, which indicates that statistical processing of data will result in nonlinear compensation benefit with this choice of N. This contrast emphasizes the importance of averaging over a number of symbols N.

To minimize the residual error $\langle |\Delta_t - \delta_t|^2 \rangle$ for each k, the following metric may be used:

$$M^k = \frac{\langle |\Delta_t - \delta_t^k|^2 W_t^k \rangle}{\langle |\Delta_t|^2 W_t^k \rangle}. \quad (12)$$

The metric in equation (12) may be minimized by varying N, the scaling factor $\alpha_k$ and the averaging window function $W_t^k$. Although the parameter p was selected as having a value of p=-1, it could be optimized using the metric in equation (12) as well. The weighting function W may be normalized so that $\Sigma W_t^k = N$ and it could be a rectangular, super Gaussian, or exponential function for example. The value of $W_t^k$ should be set to $W_t^k = 0$ for t=0.

Figure 7:
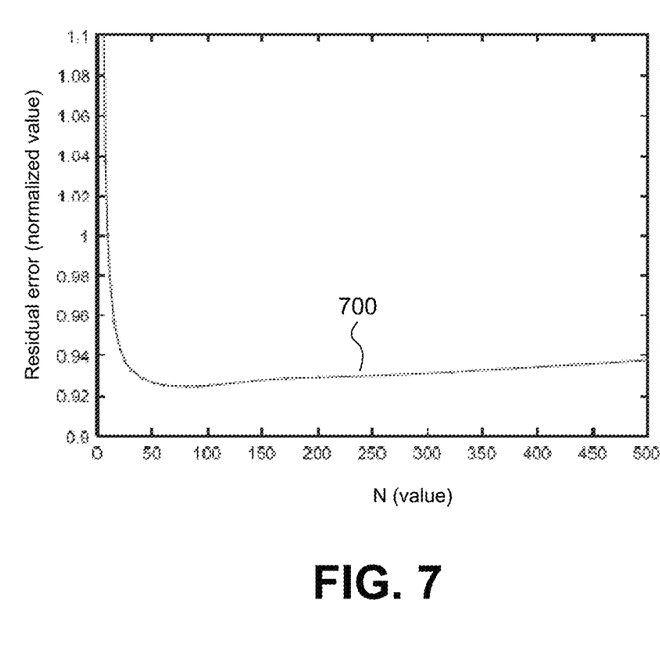
FIG. 7 includes a plot of the residual error metric vs. the length of the averaging window, i.e. the number of symbols N in the averaging window, for a system and method consistent with the present disclosure.
Figure 8:
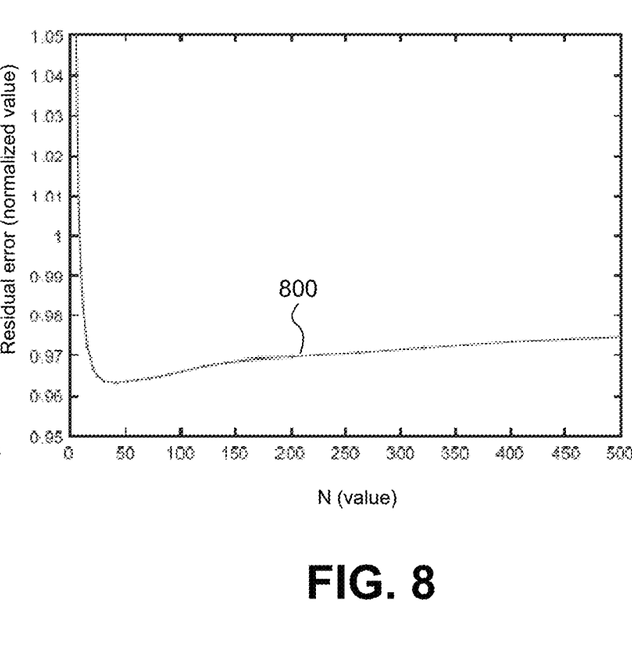
FIG. 8 includes another plot of the residual error metric vs. the length of the averaging window, i.e. the number of symbols N in the averaging window, for a system and method consistent with the present disclosure.

FIGS. 7 and 8 include plots 700 and 800, respectively, of the residual error metric $M^k$ (normalized value) vs. the length (the value of N) of the averaging window, i.e. the number of symbols N in the averaging window, for simulated examples consistent with the present disclosure. Values of the residual error metric $M^k$ less than 1 indicate that the estimate $\delta_t^k$ of $\Delta_t$ is to some degree correct, with $M^k = 0$ meaning that the estimate of $\Delta_t$ is absolutely correct. This suggests that if $\delta_t^k$ is subtracted from the received signal $y_t$, the total noise is reduced by $1 - M^k$. Values of $M^k \geq 1$ show that the estimate $\delta_t^k$ of $\Delta_t$ is incorrect and would lead to the increase of total noise if compensation was attempted using this estimate. For each k, there is an optimum length N. At the optimum choice of N for one example, the error reduction is ~7% for k=1 and 3.5% for k=2. If the contribution of ~7 taps (k=1, . . . 7) is summed, a ~33% of error reduction may be obtained. Some portion of this reduction is due to compensation of nonlinear distortions and some portion is due to compensation of some slow-varying effects that the standard equalizer did not compensate completely. This fact comes from the observation that at very large values of N, the residual error tends to saturate, which suggests the presence of slowly varying distortions in the received signal.

Advantageously, the metric $M^k$ may also be used to evaluate performance of an adaptive equalizer for demodulating an optical signal by calculating the metric using a known transmitted signal $x_t$ and determining whether the value of the metric $M^k$ is less than 1. As described above, when the value of the metric $M^k$ is less than 1 the adaptive equalizer compensates for nonlinearities, but when the value of the metric $M^k$ is greater than or equal to 1 the adaptive equalizer is not effective in compensating for nonlinearities. Evaluating performance of an adaptive equalizer using the metric may be useful for example in laboratory simulations for predicting whether a particular adaptive equalizer may be effective in compensating for nonlinearities in a particular transmission path.

In the system and method described above, a known reference signal $x_t$ was used in order to calculate the true distortion, $\Delta_t$. This enables estimation of the maximum possible distortion compensation using a statistical approach. However, in practice the reference signal $x_t$ may not be available and the error signal may be calculated as the difference between $y_t$ and the output of the bit decision 906 (FIG. 9) or the FEC decoder 210 (FIG. 2). To simulate a method consistent with the present disclosure a 30% symbol error rate was induced by adding white Gaussian noise to the reference signal $x_t$ and the total error compensation reduced from 33% to 30%. This simulation demonstrates a system and method consistent with the present disclosure is robust to noise in the reference signal.

Also, for simplicity the system and method described above is described with reference to a single polarization only. It is to be understood, however, that a in a polarization multiplexed configuration a system and method consistent with the present disclosure may calculate filter coefficients for each polarization using the using past and future symbols from both polarizations to compensate for nonlinearities. For example, a known butterfly-type equalizer could be used with equations (5) and (10) in a polarization multiplexed configuration.

An adaptive equalizer 208 consistent with the present disclosure may be implemented in a variety of configurations. One example 208a of an adaptive equalizer consistent with the present disclosure is illustrated in block-diagram form in FIG. 9. The illustrated embodiment includes an adaptive filter 902, an optional maximum a posteriori (MAP) decoder 904, a bit decision detector 906 and an output signal calculation function 908.

Figure 9:
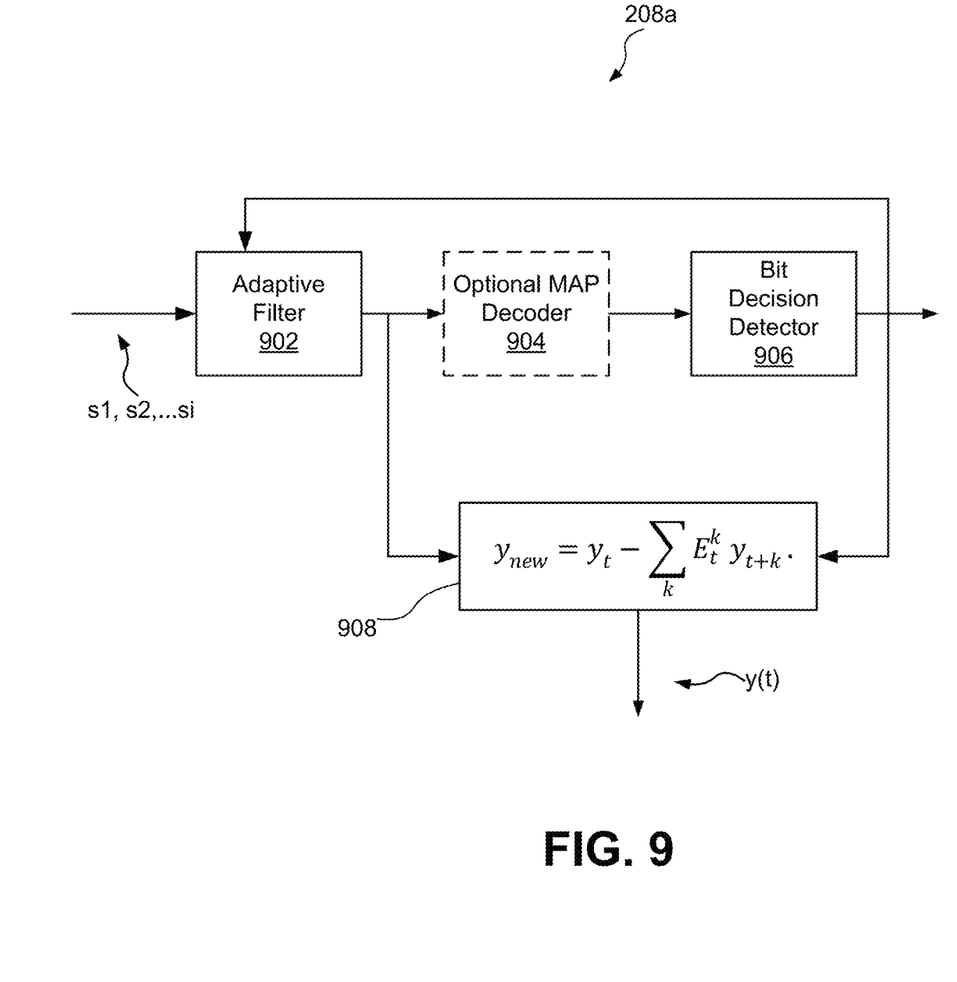
FIG. 9 is a block diagram illustrating one exemplary embodiment of an adaptive equalizer useful in a receiver consistent with the present disclosure.

The adaptive filter 902 receives the symbols s1, s2 . . . si from the pre-processing function and adjusts parameters to minimize the error between the output of the adaptive filter 902 and the output of the bit decision decoder 906 consistent with the approach described above. The adaptive filter 902 may be a slow equalizer. Term "slow" refers to changes or distortions in the signal that occur on a scale of two or more orders of magnitude slower compared to the symbol rate. The bit decision detector 906 may be a known hard decision detector configured to compare an input thereto to a threshold to provide a decision as to whether a particular or symbol is a "1" or a "0." The output signal calculation function 908 calculates $y_{new}=y_t-\Sigma_k E_t^k y_{t+k}$ and provides the result as the output y(t). The optional MAP decoder 904 may provide a decoded output to the bit decision detector 906 in a known manner. Also, the filter coefficients may be iteratively calculated for each bit or symbol using an improved output signal $y_{new}$ as feedback to the adaptive equalizer 208a in each new iteration to improve performance.

Figure 10:
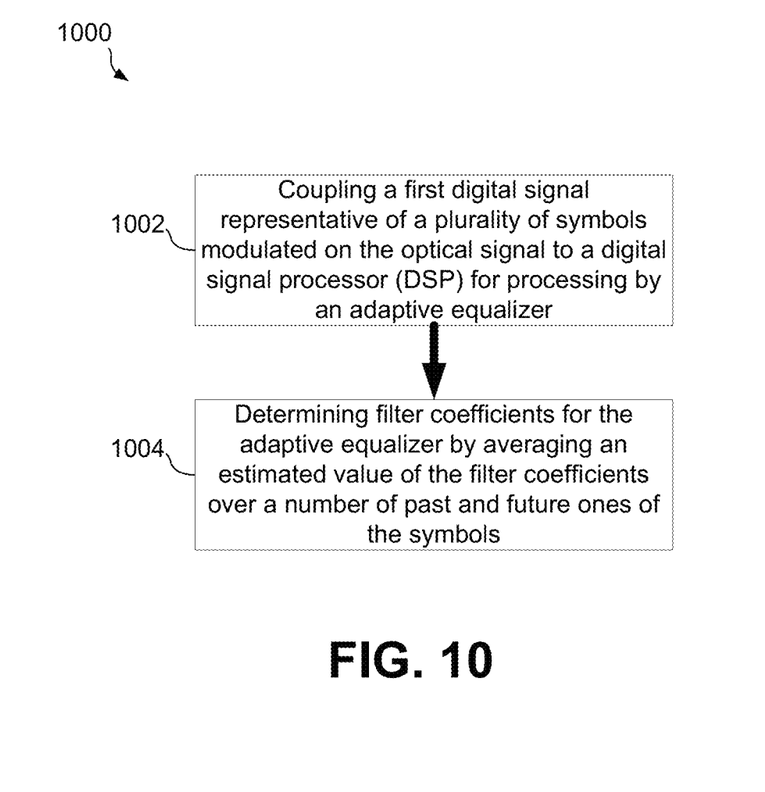
FIG. 10 is a block flow diagram illustrating an exemplary method consistent with the present disclosure.

FIG. 10 is a flow chart illustrating a method 1000 of demodulating an optical signal consistent with the present disclosure. Operation 1002 includes coupling a first digital signal representative of a plurality of symbols modulated on the optical signal to a digital signal processor (DSP) for processing by an adaptive equalizer. In operation 1004 filter coefficients for the adaptive equalizer are determined by averaging an estimated value of the filter coefficients over a number of past and future ones of the symbols. While FIG. 10 illustrates various operations according to an embodiment, it is fully contemplated herein that in other embodiments of the present disclosure, the operations depicted in FIG. 10, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

Advantageously, a system and method provides a significant performance benefit compared to standard back propagation. For an experimental data sample acquired after a slow equalization and corresponding to a known 32 Gbaud reference signal $x_t$, 16-QAM-based signal transmitted over ~6,000 km of dispersion uncompensated fiber system, Q performance was measured using a system and method consistent with the present disclosure and also using a known standard single-channel back-propagation technique. The experimental system used only one polarization of a polarization multiplexed signal and did not use a MAP decoder. Using reference signal $x_t$ for a system and method consistent the present disclosure provided a 1.25 dB Q-factor benefit, whereas the single channel back-propagation technique produced a 1.1 dB Q-factor benefit. Using decision data that is directly available after data recovery, the Q-factor benefit was reduced to 0.6 dB.

There is thus provided a system and method including an adaptive equalizer wherein filer coefficients are updated by averaging an estimated filter coefficient over a number, N, of past and future symbols. Estimated filter coefficients may be optimized by optimization of the number N, an averaging window function $W_t^k$ and a scaling factor $\alpha_k$ using a metric $M^k$. The metric $M^k$ also allows estimation of the amount of noise that may be compensated by an adaptive equalizer consistent with the present disclosure.

According to one aspect of the disclosure, there is provided an optical signal receiver including: a coherent receiver for receiving an optical signal and providing a receiver output representative of a plurality of symbols; and a digital signal processor (DSP) configured to receive a digital signal representative of the plurality of symbols, the digital signal processor including an adaptive equalizer including a plurality of delays for producing successively delayed versions of the digital signal and a plurality of multipliers, each of the multipliers multiplying the digital signal or an associated one of the delayed versions of the digital signal with an associated filter coefficient to produce an associated tap weight product, the tap weight products being summed to provide an output for the adaptive equalizer, each of the filter coefficients being determined by averaging an estimated value of the filter coefficients over a number of past and future ones of the symbols.

According to another aspect of the disclosure, there is provided a method of demodulating an optical signal. The method includes coupling a first digital signal representative of a plurality of symbols modulated on the optical signal to a digital signal processor (DSP) for processing by an adaptive equalizer; and determining filter coefficients for the adaptive equalizer by averaging an estimated value of the filter coefficients over a number of past and future ones of the symbols.

According to another aspect of the disclosure, there is provided an optical communication system including a transmitting terminal for transmitting a plurality of optical signals, each at a different associated wavelength and having a plurality of symbols modulated thereon, on an optical information path; and an optical signal receiver coupled to the optical information path for receiving the at least one of the plurality of optical signals. The optical signal receiver includes: a coherent receiver for receiving the at least one of the plurality of optical signals and providing an output in response to the at least one of the plurality of optical signals, and a digital signal processor (DSP) configured to receive a digital signal representative of the plurality of symbols. The DSP includes an adaptive equalizer including a plurality of delays for producing successively delayed versions of the digital signal and a plurality of multipliers, each of the multipliers multiplying the digital signal or an associated one of the delayed versions of the digital signal with an associated filter coefficient to produce an associated tap weight product, the tap weight products being summed to provide an output for the adaptive equalizer. Each of the filter coefficients is determined by averaging an estimated value of the filter coefficients over a number of past and future ones of the symbols.

Embodiments of the methods described herein may be implemented using a processor and/or other programmable device, such as the DSP 204. To that end, the methods described herein may be implemented on a tangible, non-transitory computer readable medium having instructions stored thereon that when executed by one or more processors perform the methods. Thus, for example, the DSP 204 may include a storage medium (not shown) to store instructions (in, for example, firmware or software) to perform the operations described herein. The storage medium may include any type of tangible medium, for example, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure.

Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

As used in any embodiment herein, "circuitry" may comprise, for example, singly or in any combination, hardwired circuitry, programmable circuitry, state machine circuitry, and/or firmware that stores instructions executed by programmable circuitry. In at least one embodiment, the DSP 204 may comprise one or more integrated circuits. An "integrated circuit" may be a digital, analog or mixed-signal semiconductor device and/or microelectronic device, such as, for example, but not limited to, a semiconductor integrated circuit chip.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An optical signal receiver comprising: a coherent receiver for receiving an optical signal and providing a receiver output representative of a plurality of symbols; and a digital signal processor (DSP) configured to receive a digital signal representative of the plurality of symbols, the digital signal processor comprising an adaptive equalizer comprising a plurality of delays for producing successively delayed versions of the digital signal and a plurality of multipliers, each of the multipliers multiplying the digital signal or an associated one of the delayed versions of the digital signal with an associated filter coefficient to produce an associated tap weight product, the tap weight products being summed to provide an output for the adaptive equalizer, each of the filter coefficients being determined by averaging an estimated value of the filter coefficients over a number of past symbols and future symbols.

2. An optical signal receiver according to claim 1, wherein the averaging an estimated value of the filter coefficients over a number of past and future ones of the symbols is calculated as:

$$\langle G_t \rangle \equiv \frac{1}{N+1} \sum_{n=-N/2}^{N/2} G_{t+n}$$

where $G_t$ is the estimated value, and N is the number of the past and future ones of the symbols.

3. An optical signal receiver according to claim 1, wherein the estimated value of the filter coefficients is calculated as:

$$_p^N E_t^k = \alpha_k \frac{\langle \Delta_t \cdot |y_{t+k}|^p \exp(-i \cdot \arg(y_{t+k})) W_t^k \rangle}{\langle |y_{t+k}|^{p+1} \rangle},$$

where k is a number of taps in the adaptive equalizer, t denotes a current update cycle, p is a variable parameter, $\langle \ \rangle$ indicates the averaging the estimated value of the filter coefficients over the number N of past and future ones of the symbols, $\alpha_k$ is a scaling factor, $W_t^k$ is an averaging window function, $y_t$ is an output of the equalizer, and $\Delta_t$ is an error signal.

4. An optical signal receiver according to claim 1, wherein the estimated value of the filter coefficients is calculated as:

$$_1^N E_t^k = \alpha_k \frac{\langle \Delta_t \cdot y_{t+k}^* W_t^k \rangle}{\langle |y_{t+k}|^2 W_t^k \rangle},$$

where k is a number of taps in the adaptive equalizer, t denotes a current update cycle, $\langle \ \rangle$ indicates the averaging the estimated value of the filter coefficients over the number N of past and future ones of the symbols, $\alpha_k$ is a scaling factor, $W_t^k$ is an averaging window function, $y_t$ is an output of the equalizer, and $\Delta_t$ is an error signal.

5. An optical signal receiver according to claim 1, wherein the number of past and future ones of the symbols is optimized using a metric given as:

$$M^k = \frac{\langle |\Delta_t - \delta_t^k|^2 W_t^k \rangle}{\langle |\Delta_t|^2 W_t^k \rangle}$$

where k is a number of taps in the adaptive equalizer, t denotes a current update cycle, $\Delta_t$ is an error signal defined by the difference between an output the equalizer $y_t$ and a transmitted known reference signal $x_t$, and $\delta_t^k$ is an estimate of $\Delta_t$ for tap k, and $W_t^k$ is an averaging window function.

6. An optical signal receiver according to claim 1, wherein the adaptive equalizer is configured to iteratively calculate the filter coefficients using the output of the equalizer for each iteration.

7. A method of demodulating an optical signal, the method comprising: coupling a first digital signal representative of a plurality of symbols modulated on the optical signal to a digital signal processor (DSP) for processing by an adaptive equalizer; and determining filter coefficients for the adaptive equalizer by averaging an estimated value of the filter coefficients over a number of past symbols and future symbols.

8. A method according to claim 7, wherein the averaging an estimated value of the filter coefficients over a number of past and future ones of the symbols is calculated as:

$$\langle G_t \rangle \equiv \frac{1}{N+1} \sum_{n=-N/2}^{N/2} G_{t+n}$$

where $G_t$ is the estimated value, and N is the number of the past and future ones of the symbols.

9. A method according to claim 7, wherein the estimated value of the filter coefficients is calculated as:

$${}_p^N E_t^k = \alpha_k \frac{\langle \Delta_t \cdot |y_{t+k}|^p \exp(-i \cdot \arg(y_{t+k})) W_t^k \rangle}{\langle |y_{t+k}|^{p+1} \rangle},$$

where k is a number of taps in the adaptive equalizer, t denotes a current update cycle, p is a variable parameter, $\langle \ \rangle$ indicates the averaging the estimated value of the filter coefficients over the number N of past and future ones of the symbols, $\alpha_k$ is a scaling factor, $W_t^k$ is an averaging window function, $y_t$ is an output of the equalizer, and $\Delta_t$ is an error signal $_t$.

10. A method according to claim 7, wherein the estimated value of the filter coefficients is calculated as:

$${}_1^N E_t^k = \alpha_k \frac{\langle \Delta_t \cdot y_{t+k}^* W_t^k \rangle}{\langle |y_{t+k}|^2 W_t^k \rangle},$$

where k is a number of taps in the adaptive equalizer, t denotes a current update cycle, $\langle \ \rangle$ indicates the averaging the estimated value of the filter coefficients over the number N of past and future ones of the symbols, $\alpha_k$ is a scaling factor, $W_t^k$ is an averaging window function, $y_t$ is an output of the equalizer, and $\Delta_t$ is an error signal.

11. A method according to claim 7 further comprising optimizing the number of past and future ones of the symbols using a metric given as:

$$M^k = \frac{\langle |\Delta_t - \delta_t^k|^2 W_t^k \rangle}{\langle |\Delta_t|^2 W_t^k \rangle}$$

where k is a number of taps in the adaptive equalizer, t denotes a current update cycle, $\Delta_t$ is an error signal defined by the difference between an output the equalizer $y_t$ and a transmitted known reference signal $x_t$, and $\delta_t^k$ is an estimate of $\Delta_t$ for tap k, and $W_t^k$ is an averaging window function.

12. A method according to claim 7 further comprising iteratively calculating the filter coefficients using the output of the equalizer for each iteration.

13. An optical communication system comprising: a transmitting terminal for transmitting a plurality of optical signals; each at a different associated wavelength and having a plurality of symbols modulated thereon, on an optical information path; and an optical signal receiver coupled to the optical information path for receiving the at least one of the plurality of optical signals, the optical signal receiver comprising: a coherent receiver for receiving the at least one of the plurality of optical signals and providing an output in response to the at least one of the plurality of optical signals, and a digital signal processor (DSP) configured to receive a digital signal representative of the plurality of symbols, the digital signal processor comprising an adaptive equalizer comprising a plurality of delays for producing successively delayed versions of the digital signal and a plurality of multipliers, each of the multipliers multiplying the digital signal or an associated one of the delayed versions of the digital signal with an associated filter coefficient to produce an associated tap weight product, the tap weight products being summed to provide an output for the adaptive equalizer, each of the filter coefficients being determined by averaging an estimated value of the filter coefficients over a number of past symbols and future symbols.

14. An optical communication system according to claim 13, wherein the averaging an estimated value of the filter coefficients over a number of past and future ones of the symbols is calculated as:

$$\langle G_t \rangle \equiv \frac{1}{N+1} \sum_{n=-N/2}^{N/2} G_{t+n}$$

where $G_t$ is the estimated value, and N is the number of the past and future ones of the symbols.

15. An optical communication system according to claim 13, wherein the estimated value of the filter coefficients is calculated as:

$${}_p^N E_t^k = \alpha_k \frac{\langle \Delta_t \cdot |y_{t+k}|^p \exp(-i \cdot \arg(y_{t+k})) W_t^k \rangle}{\langle |y_{t+k}|^{p+1} \rangle},$$

where k is a number of taps in the adaptive equalizer, t denotes a current update cycle, p is a variable parameter, $\langle \ \rangle$ indicates the averaging the estimated value of the filter coefficients over the number N of past and future ones of the symbols, $\alpha_k$ is a scaling factor, $W_t^k$ is an averaging window function, $y_t$ is an output of the equalizer, and $\Delta_t$ is an error signal.

16. An optical communication system according to claim 13, wherein the estimated value of the filter coefficients is calculated as:

$${}_1^N E_t^k = \alpha_k \frac{\langle \Delta_t \cdot y_{t+k}^* W_t^k \rangle}{\langle |y_{t+k}|^2 W_t^k \rangle},$$

where k is a number of taps in the adaptive equalizer, t denotes a current update cycle, $\langle \ \rangle$ indicates the averaging the estimated value of the filter coefficients over the number N of past and future ones of the symbols, $\alpha_k$ is a scaling factor, $W_t^k$ is an averaging window function, $y_t$ is an output of the equalizer, and $\Delta_t$ is an error signal.

17. An optical communication system according to claim 13, wherein the number of past and future ones of the symbols is optimized using a metric given as:

$$M^k = \frac{\langle |\Delta_t - \delta_t^k|^2 W_t^k \rangle}{\langle |\Delta_t|^2 W_t^k \rangle}$$

where k is a number of taps in the adaptive equalizer, t denotes a current update cycle, $\Delta_t$ is an error signal defined by the difference between an output the equalizer $y_t$ and a transmitted known reference signal $x_t$, and $\delta_t^k$ is an estimate of $\Delta_t$ for tap k, and $W_t^k$ is an averaging window function.

18. An optical communication system according to claim 13, wherein the adaptive equalizer is configured to iteratively calculate the filter coefficients using the output of the equalizer for each iteration.

\* \* \* \* \*